United States Patent [19]

Stache et al.

[11] 3,725,393

[45] Apr. 3, 1973

[54] 3-N-ALKYL-AMINO-CARDENOLIDES AND PROCESS FOR THEIR MANUFACTURE

[75] Inventors: Ulrich Stache, Hofheim/Taunus; Werner Fritsch, Neuenhain/Taunus; Werner Haede, Hofheim/Taunus; Kurt Radscheit, Kelkheim/Taunus; Ernst Lindner, Frankfurt/Main, all of Germany

[73] Assignee: Farbwerke Hoeshst Aktiengesellschaft vormals Meister Lucius & Bruning, Frankfurt/Main, Germany

[22] Filed: Oct. 18, 1971

[21] Appl. No.: 190,281

[30] Foreign Application Priority Data

Oct. 19, 1970 Germany.................P 20 51 204.3

[52] U.S. Cl..............................260/239.57, 260/999
[51] Int. Cl.............................................C07c 173/02
[58] Field of Search ......./Machine Searched Steroids

*Primary Examiner*—Henry A. French
*Attorney*—Henry W. Koster et al.

[57] ABSTRACT

3-N-alkyl-amino-cardenolides of the general formula

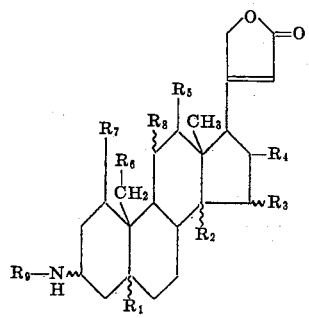

in which $R_1$ represent hydrogen or $\beta$-hydroxy; $R_2$ and $R_3$ each represents hydrogen or hydroxy, or $R_2$ and $R_3$ together represent a further C-C bond or an $\alpha$- or $\beta$-oxido group; $R_4$, $R_5$, $R_6$ and $R_7$ each represent hydrogen or a hydroxy group which may be esterified — the OH-group for $R_6$ may also be etherified —; $R_8$ represents hydrogen or hydroxy; and $R_9$ represents an alkyl group with one to six carbon atoms which may contain one or several OH-groups, or an araliphatic radical, and the salts thereof with inorganic or organic acids. The compounds have valuable pharmacological properties, especially a positive or negative inotropic action, and a substantially improved solubility in lipids.

14 Claims, No Drawings

3-N-ALKYL-AMINO-CARDENOLIDES AND PROCESS FOR THEIR MANUFACTURE

The present invention relates to 3-N-alkyl-amino-cardenolides of the general formula

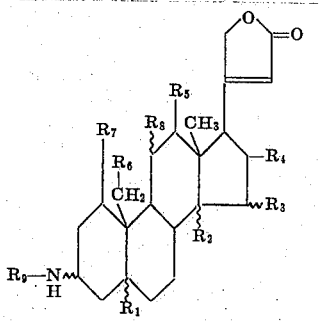

in which $R_1$ represents hydrogen or β-hydroxy; $R_2$ and $R_3$ each represent hydrogen or hydroxy, or $R_2$ and $R_3$ together represent a further C—C bond or an α- or β-oxido group; $R_4$, $R_5$, $R_6$ and $R_7$ each represent hydrogen or a hydroxy group which may be esterified — the OH-group for $R_6$ may also be etherified —; $R_8$ represents hydrogen or hydroxy; and $R_9$ represents an alkyl group with one to six carbon atoms which may contain one or several OH-groups, or an araliphatic radical, and to the salts thereof with inorganic or organic acids.

This invention relates furthermore to a process for the manufacture of these compounds which comprises catalytically hydrogenating 3-oxo-cardenolides of the above-mentioned formula, but wherein there is a 3-oxo function instead of the 3-N-alkylamino group, wherein $R_1$ to $R_8$ have the above-given meanings, and wherein there may additionally be a 4(5)-double bond, with hydrogen in inert solvents in the presence of primary aliphatic or araliphatic amines corresponding to the meaning of $R_9$ and in the presence of metal catalysts, and converting the 3-N-alkylamino-cardenolides obtained into the acid addition salts thereof, if desired, with organic or inorganic acids. First, the Schiff's base (azomethine) is formed from the primary amine and the 3-oxo group and then it is hydrogenolytically saturated under the conditions of the hydrogenation to yield the 3-N-alkylamino group.

The fact that the azomethine double bond in the 3-position is hydrogenated in preference to the 20(22)-double bond of the 17β-butenolide ring, that is to say that a partial hydrogenation is possible, is very surprising and could not be foreseen. Moreover, even an isolated double bond or an oxido group in 14,15-position is generally not hydrogenated. Hydroxy groups in the free, esterified or etherified form in 1-, 5-, 11-, 12-, 14-, 15-, 16- and 19-positions are also not affected during the reaction. However, a 4,5-double bond, for example in the case of the canarigenone derivative, is hydrogenated during the catalytic hydrogenation of the 3-azomethine group, whereupon the corresponding 3-N-alkylamino-cardenolides saturated in 4,5-position are obtained.

As starting substances there may be mentioned the following 3-oxo-cardenolides which may be obtained by oxidation of the corresponding known 3α- or 3β-hydroxy-cardenolides according to methods known in the steroid chemistry: Digitoxigenone, uzarigenone, canarigenone, 3-dehydro-periplogenin, 3-dehydro-gitoxigenin, 3-dehydro-sarmentogenin, 3-dehydro-oleandrigenin, 3-dehydro-digoxigenin, 3-dehydro-k-strophanthidole, 3-dehydro-mallogenin, 3-dehydro-coroglaucigenin, 3-dehydro-acovenosigenin A,3-dehydro-adonitoxigenin, 3-oxo-5β,14α-card-20(22)-enolide, 3-oxo-5α, 14α-card-20(22)-enolide, 3-oxo-carda-4,20(22)-dienolide, 3-oxo-14,15α-oxido-5β- or 5α-card-20(22)-enolide, 3-oxo-14, 15β-oxido-5β- or 5α-card-20(22)-enolide, 3-oxo-14,15α- or 14,15β-oxido-carda-4,20(22)-dienolide, 3-oxo-carda-4,14,20(22)-trienolide, 3-oxo-5β- or 5α-carda-14,20(22)-dienolide.

As primary amines there are, for example, mentioned: Methylamine, ethylamine, n-propylamine, isopropylamine, n-butylamine, tert.-butylamine, pentylamine, n-hexylamine, ethanolamine, propanolamine, butanolamine, propylene-glycol amine and benzylamine.

The catalyst used for the catalytic hydrogenation of the 3-azomethine group of the Schiff's base which is first formed, to yield the 3-N-alkylamino group, are, for example, the following: palladium, platinum, rhodium, zinc, nickel or iridium catalysts or mixtures of these catalysts, preferably palladium catalysts, for example palladium supported on charcoal, palladium supported on barium or strontium carbonate, or nickel catalysts, for example Raney nickel, or also mixed catalysts made from palladium and Raney nickel.

The catalytic hydrogenation is carried out according to usual methods. Ethanol, methanol, propanol, there are, for example, used ethanol, methanol, propanol, tetrahydrofuran, dioxan, methylene chloride, dichloroethane, chloroform, benzene, toluene or mixtures of these solvents, with or without the addition of water are used as solvents for the catalytic hydrogenation, for example. The reaction is performed at normal pressure to a pressure of up to about 50 atmospheres gauge at temperatures between −20° to + 80°C, preferably 10°C to 60°C, in apparatus conventional for catalytic hydrogenation. In this connection, it is important to discontinue the catalytic hydrogenation after the absorption of about 1 mol-equivalent of hydrogen gas if there is no double bond in 4(5)-position, or after the absorption of 2 mol-equivalents of hydrogen gas if there is a double bond in 4(5)-position, unless the hydrogenation comes to a standstill on its own after absorption of these hydrogen amounts. By checking the UV absorption within the range from 207 to 220 mµ ( = 17β-butenolide ring), the course of the hydrogenation can be controlled.

The catalyst is then separated by filtration and the filtrate is concentrated. The crude products thus obtained are advantageously purified by converting them into their 3-N-alkylamino-cardenolide salts by a reaction with inorganic or organic acids, for example hydrochloric acid, hydrobromic acid or hydroiodic acid, sulfuric acid, oxalic acid, acetic acid, formic acid, propionic acid, phthalic acid, picric acid, or ascorbic acid, in inert solvents, for example ether, tetrahydrofuran, dioxan, ethanol, or methanol. These salts are then purified either by recrystallization from inert solvents or by other generally known purification operations. The purified 3-N-alkylamino-cardenolide salts thus obtained are then reconverted by reaction with weak inorganic bases, for example sodium bicarbonate or sodium carbonate, into the free 3-N-alkylamino-cardenolides which are then recrystallized, where required. The salts of the 3-N-alkylamino-cardenolides may, however, also be used directly for therapeutic purposes.

In the form of their free N-alkylamine bases or their salts, the products of the invention have valuable pharmacological properties. They exhibit cardiotonic actions (for example a positive or negative inotropic action). The relationship of the cardiotonic actions to each other is surprisingly different from that for the corresponding cardenolides oxygenated in the 3position, from which they are derived. It is furthermore surprising that highly cardiotonic active components are contained even in those compounds and intermediates of the invention which do not carry an oxygen function in the 14-position (for example, structures having a 14 - H or 14(15)-double bond), although it is known that the analogues thereof carrying an oxygen function in the 3-position but not in the 14-position, do not show corresponding actions. Moreover, the products of the invention exhibit interesting cardiovascular and/or adrenergic properties.

Animal tests may be carried out as the atrium test or as the K-excretion test on the isolated heart of guinea pigs. Thus, in animal tests, the 3-N-alkyl-aminocardenolides show a positively inotropic activity comparable to the cardiac glycosides, but they often have a higher oral resorption rate than those glycosides. Further, pharmacologically important parameters such as duration of action, adhesion on the receptors of the heart muscle cell and cumulation are positively influenced by the introduction of the 3-N-alkylamino group into the steroid. Also, the products of the process of the invention excel by their substantially better lipid-solubility in comparison with the starting substances.

The new compounds are valuable therapeutic agents against cardiac insufficiency. The single dose for a human being may be from about 0.1 to 1 mg per unit. The new compounds may be therapeutically administered above all in their oral application form as dragees, tablets or capsules, for which the usual pharmaceutical carriers, for example, starch, lactose, tragacanth, magnesium stearate and talcum, may be used. For intravenous injections water, or physiological sodium chloride solution may serve as solvents for the ampoules.

The following Examples serve to illustrate the invention.

EXAMPLE 1

A solution of 1 g of 3-oxo-5β-carda-14,20(22)-dienolide in 20 ml of methanol and 10 ml of dichloroethane was added to a pre-hydrogenated suspension of a palladium-charcoal catalyst in 6 ml of methanol and the mixture was hydrogenated, after addition of 0.3 ml of ethanolamine, at normal pressure and at 20°C. After absorption of 66 ml of hydrogen (theoretical consumption 60 ml), hydrogen absorption ceased. The catalyst was separated by filtration and the solvent was distilled off in vacuo. A residue of 865 mg was obtained, which was dissolved in 4 ml of absolute tetrahydrofuran for conversion into the N-alkylamine hydrochloride. The solution was then acidified with ethereal hydrochloric acid until a pH of about 2 was reached, whereupon a crystallized precipitate separated. The solvent was removed in vacuo, the residue was taken up in 70 ml of water, the solution was heated on a steam bath for a short time, a small amount of undissolved substance was separated by filtration and the clear filtrate was combined with aqueous sodium carbonate solution until a pH of about 8 to 10 was reached, whereupon a precipitate separated. The mixture was then extracted once with ether and twice with acid-free methylene chloride. After elimination of the solvent from the methylene chloride extracts, there remained a residue which was crystallized from ether. 3-N-ethanol-amino-5β-carda-14,20(22)-dienolide was obtained as a free amine having a melting point of 125° – 127°C.

Typical infrared bands (KBr): 3370, 3290, 1780, 1745, 1625 cm$^{-1}$.

When the residue obtained after acidification with ethereal hydrochloric acid and after concentration was digested several times with absolute ether, crystals were obtained which were the 3-N-ethanol-amino-5β-carda-14,20(22)-dienolide hydrochloride. Typical infrared bands (KBr): 3420, 1780, 1745, 1625, 1580 cm$^{-1}$ Beilstein test : strongly positive.

The same compound of the invention (both as a free amine and as the hydrochloride) was obtained by using 1 g of 3-oxo-carda-4,14,20(22)-trienolide for the reaction instead of 3-oxo-5β-carda-14,20(22)-dienolide. In this case, about twice the amount of hydrogen (128 ml of H$_2$) was absorbed.

EXAMPLE 2

A solution of 1 g of 3-oxo-5β-carda-14,20(22)-dienolide in 20 ml of methanol and 10 ml of dichloroethane was catalytically hydrogenated, after addition of 1 ml of an aqueous 50 percent ethylamine solution, in the presence of 600 mg of 10 percent palladium on charcoal (pre-hydrogenated in 6 ml of methanol) in the manner disclosed in Example 1. After absorption of about 1 mol-equivalent of hydrogen, hydrogenation was discontinued. After a further treatment and purification via the hydrochloride as indicated in Example 1, the 3-N-ethylamino-5β-carda-14,20(22)-dienolide was obtained.

Typical infrared bands (KBr): 3320, 1775, 1745, 1630 cm$^{-1}$. When the residue obtained upon acidification with ethereal hydrochloric acid and upon concentration was digested several times with absolute ether or recrystallized from methylene chloride/ether, 3-N-ethylamino-5β-carda-14,20(22)-dienolide hydrochloride was obtained in the form of crystals.

Typical infrared bands (KBr): 1780, 1745, 1625, 1580cm$^{-1}$

EXAMPLE 3

A solution of 2 g of digitoxigenone in 40 ml of methanol was catalytically hydrogenated at 25°C, after addition of 0.6 ml of ethanolamine, in the presence of 1.2 g of 10 percent palladium-charcoal (pre-hydrogenated in 10 ml of methanol) in the manner indicated in Example 1. Upon absorption of 133.6 ml of hydrogen (theoretical consumption about 120 ml), hydrogenation was discontinued. After the further treatment and purification via the hydrochloride as indicated in Example 1, 3-N-ethanolamino-3-desoxydigitoxigenin having a melting point of 145° – 152°C was obtained.

Typical infrared bands (KBr): 3440, (NH-band within the range of from 3400 to 3100 was difficult to establish), 1775, 1740, 1620 cm$^{-1}$.

When the residue obtained upon acidification with ethereal hydrochloric acid and upon concentration was digested several times with absolute ether, the 3-N-ethanol-amino-3-desoxy-digitoxigenin hydrochloride was obtained in the form of crystals, m.p. 280° – 290°C (decomposition).

Typical infrared bands (KBr): 3380, 1770, 1735, 1620, 1585 cm$^{-1}$.

EXAMPLE 4

A solution of 14 g of 3-oxo-5β-14α-card-20(22)-enolide in 500 ml of methanol and 200 ml of dichloroethane was catalytically hydrogenated at 25°C, after addition of 4 ml of ethanolamine, in the presence of 8 g of 10 percent palladium-charcoal (pre-hydrogenated in 50 ml of methanol) in the manner indicated in Example 1. Upon absorption of 1,120 ml of hydrogen, hydrogenation was discontinued. After the further treatment and purification via the hydrochloride as indicated in Example 1, 3-N-ethanolamine-5β-14α-card-20(22)-enolide was obtained, m.p. 199° – 200°C.

Typical infrared bands (KBr): 3420, 3275 (very sharp), 3140, 1780, 1750, 1630 cm$^{-1}$.

EXAMPLE 5

A solution of 2 g of 3-oxo-5β-card-20(22)-enolide in 40 ml of methanol was added to 1.2 g of a pre-hydrogenated suspension of a palladium-charcoal catalyst in 10 ml of methanol and the mixture was hydrogenated at 25°C and under normal pressure upon addition of 0.8 ml of n-butylamine. After absorption of 120 ml of hydrogen, the hydrogen absorption ceased. The catalyst was separated by filtration and the solvent was distilled off in vacuo. A residue of 1.6 g was obtained, which was dissolved in 8 ml of absolute tetrahydrofuran for conversion into the hydrochloride and acidified with ethereal hydrochloric acid until a pH of about 2 was reached, whereupon crystals precipitated. The solvents were then eliminated in vacuo, the residue was taken up in 140 ml of water, the solution was heated on a steam bath for a short time, a small amount of undissolved substance was separated by filtration and the clear filtrate was combined with aqueous sodium carbonate solution until a pH of about 8 to 10 was reached, whereupon a precipitate separated. The mixture was extracted once with ether and twice with acid-free methylene chloride. After elimination of the solvent from the methylene chloride extracts, there remained a residue of crude 3-N-n-butylamino-5β,14α-card-20(22)-enolide which was converted for characterization into the hydrochloride. The free amine in 10 ml of absolute tetrahydrofuran was acidified with ethereal hydrochloric acid until a pH of about 2 was reached, whereupon crystals precipitated. These were suction-filled and recrystallized from dichloroethane or methylene chloride/ether. The 3-N-n-butylamino-5β,14α-card-20(22)-enolide hydrochloride was obtained, mp. 300° – 310°C (not typical). Typical infrared bands (KBr): 1770, 1740, 1620, 1580 cm$^{-1}$.

EXAMPLE 6

In a manner analogous to that indicated in Example 5, 3-N-ethylamino-5β,14α-card-20(22)-enolide hydrochloride, m.p. above 300°C, was prepared from 2 g of 3-oxo-5β,14α-card-20(22)-enolide with 2 ml of 50 percent aqueous ethylamine solution as the amine reagent.

Typical infrared bands (KBr): 1775, 1745 (shoulder), 1620, 1580 cm$^{-1}$.

EXAMPLE 7

In a manner analogous to that indicated in Example 5, 3-N-ethylamino-3-desoxy-digitoxigenin hydrochloride, m.p. above 270°C, was prepared from 2 g of digitoxigenone with 2 ml of a 50 percent aqueous ethylamine solution as the amine reagent.

Typical infrared bands (KBr): 3410, 1775, 1740, 1615, 1585 cm$^{-1}$.

EXAMPLE 8

In a manner analogous to Example 5, 3-N-ethylamino-3-desoxy-uzarigenin hydrochloride, m.p. above 300°C, was prepared from 2 g of uzarigenone with 2 ml of a 50 percent aqueous ethylamine solution as the amine reagent.

Typical infrared bands (KBr): 3420, 1780, 1740, 1620, 1585 cm$^{-1}$

EXAMPLE 9

In a manner analogous to Example 5, 3-N-ethylamino-14,15β-oxido-5β-card-20(22)-enolide hydrochloride, m.p. above 300°C, was obtained from 2 g of 3-oxo-14,15β-oxido-5β-card-20(22)-enolide with 2 ml of a 50 percent aqueous solution of ethylamine as the amine reagent.

Typical infrared bands (KBr): 1775, 1740, 1615, 1585 cm$^{-1}$.

EXAMPLE 10

In a manner analogous to Example 5, 3-N-methylamino-3-desoxy-digitoxigenin hydrochloride, m.p. above 270°C, was prepared from 2 g of digitoxigenone with 2.4 ml of an aqueous 40 percent methylamine solution.

Typical infrared bands (KBr): 3410, 1775, 1740, 1620, 1585 cm$^{-1}$

EXAMPLE 11

In a manner analogous to Example 5, 3-N-benzylamino-5β,14α-card-20(22)-enolide hydrochloride was prepared from a solution of 2 g of 3-oxo-5β,14α-card-20(22)-enolide in 35 ml of dichloroethane and 35 ml of methanol with 0.75 ml of benzylamine as the amine reagent (splitting off by hydrogenation of the benzylamino group was not brought about under the indicated conditions).

Typical infrared bands (KBr): 1780, 1745, 1620, 1580, 1505, 1490 cm$^{-1}$.

What we claim is:

1. A 3-N-alkylamino-cardenolide of the formula

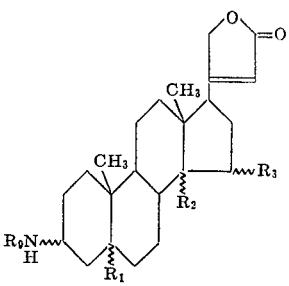

and acid addition salts thereof, wherein $R_1$ is hydrogen; $R_2$ and $R_3$, taken alone, are hydrogen or hydroxy; $R_2$ and $R_3$, taken together, are a C—C bond, $\alpha$-oxido, or $\beta$-oxido; and $R_9$ is alkyl having one to six carbon atoms, alkyl having one to six carbon atoms substituted with at least one hydroxy group, or benzyl.

2. 3-N-ethanolamino-5$\beta$-carda-14,20(22)-enolide.
3. 3-N-ethylamino-5$\beta$-carda-14,20(22)-dienolide.
4. 3-N-ethanolamino-3-desoxy-digitoxigenin.
5. 3-N-ethanolamino-5$\beta$,14$\alpha$-card-20(22)-enolide.
6. 3-N-n-butylamino-5$\beta$,14$\alpha$-card-20(22)-enolide.
7. 3-N-ethylamino-5$\beta$,14$\alpha$-card-20(22)-enolide.
8. 3-N-ethylamino-3-desoxy-digitoxigenin.
9. 3-N-ethylamino-3-desoxy-uzarigenin.
10. 3-N-ethylamino-14,15$\beta$-oxido-5$\beta$-card-20(22)-enolide.
11. 3-N-methylamino-3-desoxy-digitoxigenin.
12. 3-N-benzylamino-5$\beta$,14$\alpha$-card-20(22)-enolide.
13. A method for making a 3-N-alkylamino cardenolide as in claim 1, which comprises catalytically hydrogenating a 3-oxo-cardenolide of the formula

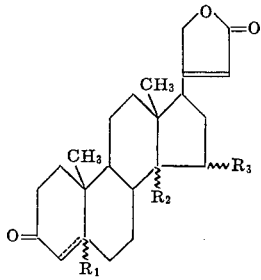

wherein $R_1$ is hydrogen; $R_2$ and $R_3$, taken alone, are hydrogen or hydroxy; $R_2$ and $R_3$, taken together, are a C-C bond, $\alpha$-oxido, or $\beta$-oxido; and the 4(5)-position may be unsaturated, with hydrogen in an inert solvent in the presence of a palladium catalyst and an amine of the formula $R_9NH_2$, wherein $R_9$ is alkyl having 1 – 6 carbon atoms, alkyl having 1 – 6 carbon atoms substituted with at least one hydroxy group, or benzyl.

14. A method as in claim 13 wherein said 3-N-alkylamino-cardenolide is salified with an acid.

* * * * *